Aug. 18, 1964   D. L. SHARPS   3,144,745
MOWING APPARATUS
Filed Sept. 27, 1963   2 Sheets-Sheet 2
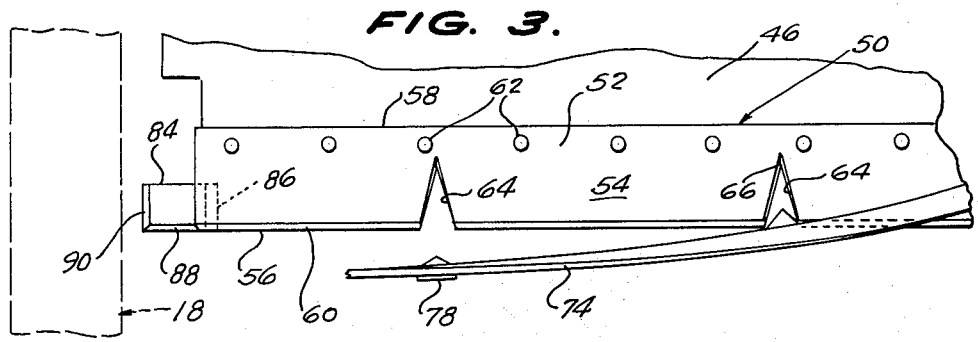
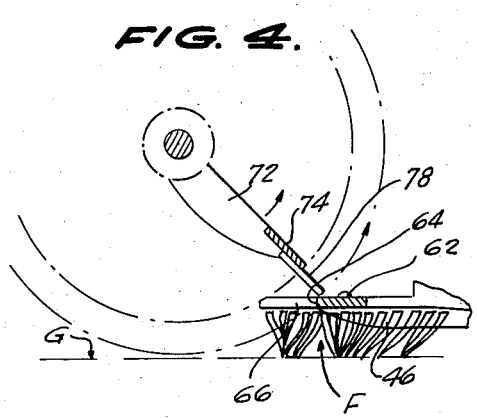
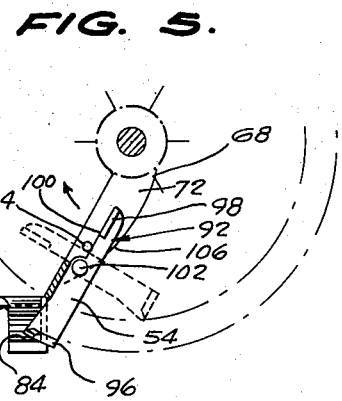
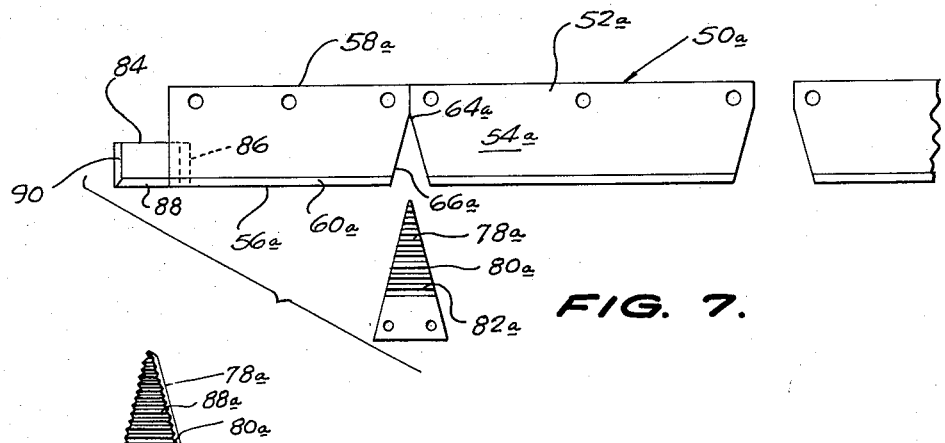
INVENTOR.
DAVID L. SHARPS,
BY
*McMorrow, Berman & Davidson*
ATTORNEYS.

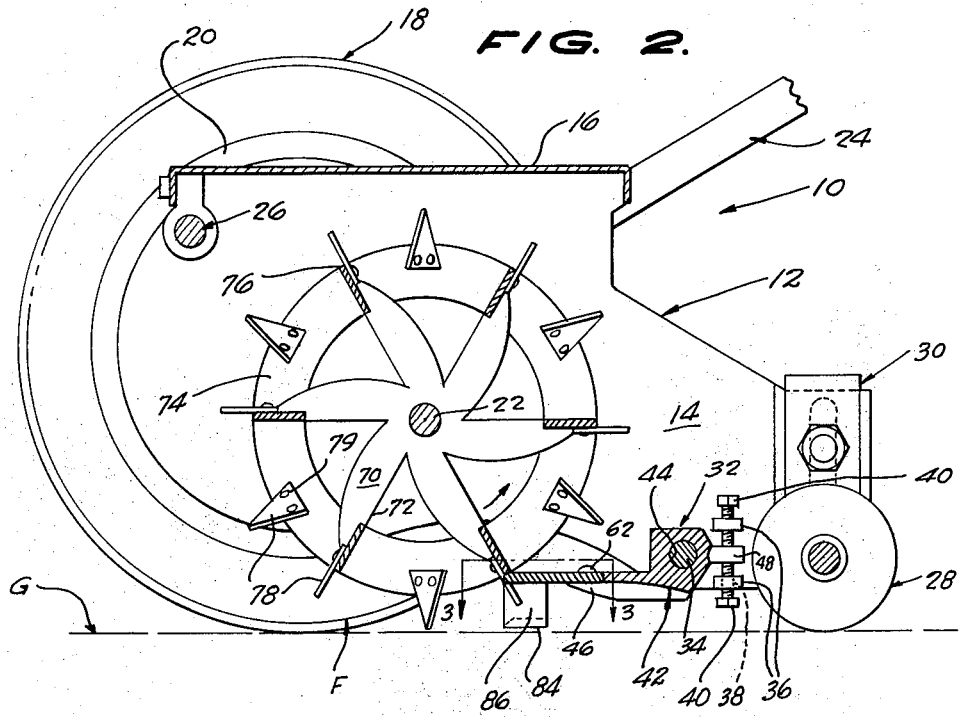

United States Patent Office 3,144,745
Patented Aug. 18, 1964

3,144,745
MOWING APPARATUS
David L. Sharps, 1113 Corn Tassel Trail, Martinsville, Va.
Filed Sept. 27, 1963, Ser. No. 312,076
9 Claims. (Cl. 56—249)

This invention relates generally to mowing apparatus, and more specifically, to a mowing machine particularly adapted for cutting lawn grass and the like.

A primary object of this invention is to provide mowing apparatus adapted to uniformly mow a lawn area which may consist of numerous varieties of grasses and the like, some of which may have fallen to the ground, and to provide means in association with the apparatus for closely trimming the lawn area around sidewalks, driveways, etc. It is therefore a basic objective of this invention to supply a mower with means to engage and cut fallen grass and the like at a substantially uniform height and at the same time to provide edging means adapted to be readily positioned for use in mowing a final row or swathe adjacent a paved area or the like.

Another objective of importance of the present invention is to provide a lawn mower of the reel type having means to force fallen grass or stalks into an upright position in advance of the blades whereby such fallen material is uniformly severed at the selected height from the ground.

It is another object of the invention to provide side edging means for use with a reel type lawn mower.

Other and further objects and advantages of the present invention will become apparent to those skilled in the art from a consideration of the following specification when read in conjunction with the annexed drawings, in which:

FIGURE 1 is a front elevational view, partially broken away, showing mowing apparatus constructed and assembled in accordance with the teachings of this invention;

FIGURE 2 is a cross sectional view, taken substantially on the section line 2—2 of FIGURE 1, looking in the direction of the arrows;

FIGURE 3 is a top plan view of a portion of the apparatus, taken from the line 3—3 of FIGURE 2, looking in the direction of the arrows;

FIGURE 4 is a sectional view of a portion of the apparatus, taken along the section line 4—4 of FIGURE 1, looking in the direction of the arrows;

FIGURE 5 is a partial view along section line 5—5 of FIGURE 1, looking in the direction of the arrows, showing edging means of this invention in operative position in full lines, and showing a retracted storage position in phantom lines;

FIGURE 6 is an enlarged, perspective view of a modified form of blade projection of this invention; and FIGURE 7 is an enlarged top plan view, partially broken away and disassembled of a modified form of blade knife used with the blade projection shown in FIGURE 6.

With more specific reference to the embodiment of the invention disclosed in FIGURES 1-5 of the drawings, reference numeral 10 therein generally designates a mowing apparatus in accordance with this invention. The mower 10 includes a frame 12 of suitable form and arrangement, the frame including opposite side members 14 and a top plate 16. Ground wheels 18 are mounted at each side of the frame 12 in gear casings 20. A blade carrying cross axle 22 extends between the side members 14 into the casings 20 and is rotated responsive to the movement of the wheels 18 by gear means (not shown) mounted within the casings. The drive means for the blade axle 22 comprises conventional mower structure, and the mower also has a handle assembly 24 and a forward cross bar brace 26 of conventional form. At the rear end of the frame, a roller 28 is mounted in vertically adjustable brackets 30 secured to the respective side members 14, whereby the cutting height of the mower is adjusted in the usual manner.

The bed knife support assembly of this invention is generally designated by reference numeral 32, and comprises a rod 34 fixedly secured between the side members 14, and at least one of the side members has a pair of vertically spaced bosses 36 thereon adjacent the rod. The bosses 36 have threaded, vertical bores 38 therein which receive setscrews 40. A bed knife mounting bar 42, having an opening 44 extending therethrough, is pivotally mounted on the rod 34 which is extended through the opening 44 thereof, and the bar 42 has a continuous forward knife mounting plate 46 and rear adjustment projections 48 at each side. The projections 48 are located between the setscrews 40 whereby the bar 42 is pivotally adjusted by vertical movement of the screws in the bores to permit raising or lowering of the bed knife relative to the cutting edge of the reel blades, described below.

The first form of bed knife 50 of this invention per se is best seen in FIGURE 3, and comprises an elongated, substantially rectangular main body portion 52 having an elongated central section 54 with a leading end 56 and trailing end 58. The leading end 56 is sharpened at 60 to provide a cutting edge, and rivet means 62, or the like, spaced along the knife adjacent the end 58 secure the knife to the plate 46. At preselected, spaced locations, the bed knife has V-shaped notches 64 formed therein opening along its leading edge 56, the notches being sharpened as at 66 to provide cutting edges therealong, for a purpose appearing in detail below.

A pair of identical but opposite blade end support sprockets 68 and an intermediate support sprocket 70 are carried by the axle 22 and rotate therewith. The sprockets 68 and 70 each include spaced arms 72 to the outer ends of which are fixed the reel blades 74. The blades 74 are of the usual form and arrangement of reel type mower blades and include cutting edges 76, however, the blades 74 of the present invention have pick-up projections 78 fixed thereto as by rivets 79, and extend outwardly from the edges 76 at selected, spaced locations to ride in the bed knife notches 64 as the reel rotates. Each projection comprises a plate of generally triangular shape having cutting edges at its sides 80 coacting with the edges 66 of the notches to shear materials therebetween. This action, it will be noted, occurs in the same horizontal plane as the normal shearing action between the blade edges 76 and the bed knife leading edge 56. Thus, a uniform height of cut is achieved throughout the full width of the central section 54 of the bed knife.

The action of the pick-up projections 78 is best seen in FIGURES 2 and 4. The reel blades 74 move in a counterclockwise direction in said figures, whereby the projections 78 contact fallen grass or weeds F at a location in advance of the cutting operation, the projections serving to elevate the grass F to an upright position for uniform cutting. The spacing between the projections may be selected on the basis of the usual sidewise extent of such fallen materials.

In the modification of the invention seen in FIGURES 6 and 7 wherein like reference characters are applied with a letter "a" appended thereto, a blade projection 78a with side edges 80a and having openings therein for connection of the rivets (not shown) is provided. The projections 78a differ from the projections 78 in that the former have plural lands and grooves 82 on one side whereby toothed cutting edges are provided. The bed knife 50a has a sectional main body portion 52a with central section 54a and is divided at the apices of the notches 64a for convenience in manufacture and to permit replacement of bent or broken sections without the necessity for replacing the entire bed knife. The toothed side edges 80a of the projections 78a makes it unnecessary to sharpen the edges 66a of notches 64a since a satisfactory shearing action is obtained between the toothed edge and a flat surface.

Each form of bed knife 50 and 50a is provided with at least one substantially rectangular end section 84 extended outwardly of the end sprocket 68 and secured to the central sections 54 and 54a by a curved plate 86 depending from the end of the section. The end section 84 has beveled forward and side edges 88, 90. The adjacent end sprocket 68 has secured to at least one, and preferably more, of its arms 72, a retractable edging means 92 seen in FIGURES 1 and 5. The edging means 92 comprises an arm member 94 having a blade 96 integrally secured in generally right angular relation to one end, and a similarly arranged handle means 98 at its other end. An indented side 100 is provided adjacent a pivot mount 102 which secures the member 94 to sprocket arm 72, and as shown in FIGURE 5, a fixed protuberance 104 extends outwardly from the arm 72. The arm 94 may be located in its full line, operational location of FIGURE 5 and is held in such location by abutment of the side 100 against the fixed protuberance 104. When use of the edger is not desired, it is sprung outwardly by gripping the handle 98, pulling outwardly thereon, and pivoting the arm to the dotted line location wherein it is held by abutment of its opposite side 106 against the protuberance.

In operation, as the operator reaches a final row or swathe to be mowed adjacent a sidewalk, driveway, or the like, the edger or edgers 92 is lowered to operational location at the side of the mower 10 adjacent the walk. The edger 92, cooperating with the blade end section 84, then effectively trims the lawn adjacent the sidewalk or the like to a depth greater than the general depth of cut of the mower resulting in a closely trimmed lawn without the necessity for application of different devices or hand labor.

Having described and illustrated various embodiments of this invention in some detail, it will be understood that these descriptions and illustrations are offered merely by way of example, and that the invention is to be limited in scope only by the appended claims.

What is claimed is:
1. A lawn mower of the reel type comprising:
(a) a frame having opposite side members;
(b) ground wheel assemblies, including ground wheels, at each side of the frame;
(c) a central axle secured to the frame between the wheels and operatively associated with the ground wheel assembly for rotation responsive to movement of the wheels;
(d) a bed knife secured to the frame, including a central section and at least one end section, the end section being in a depressed plane with respect to the central section;
(e) the central section having at least one substantially V-shaped notch formed therein;
(f) reel type blades carried by the central axle and moving in a circular path crossing the bed knife central section on each rotation;
(g) the blades carrying at least one pick-up projection, comprising a triangular plate projecting outwardly therefrom and passing through the notch in the bed knife central section;
(h) sprockets at each end of the blades;
(i) edging blades pivotally secured to the sprockets and movable from retracted positions to extended positions wherein they pass over the bed knife end section with a shearing action; and
(j) detent means to selectively retain the edging blades in either of said positions.

2. A lawn mower of the reel type comprising:
(a) frame having opposite side members;
(b) ground wheel assemblies, including ground wheels, at each side of the frame;
(c) a central axle secured to the frame between the wheels and operatively associated with the ground wheel assembly for rotation responsive to movement of the wheels;
(d) a bed knife secured to the frame, including a central section and at least one end section, the end section being in a depressed plane with respect to the central section;
(e) the central section having a plurality of substantially V-shaped notches formed therein;
(f) reel type blades carried by the central axle and moving in a circular path crossing the bed knife central section on each rotation;
(g) the blades carrying a plurality of pick-up projections, comprising a triangular plate projecting outwardly therefrom and passing through the notch in the bed knife central section;
(h) sprockets at each end of the blades;
(i) edging blades pivotally secured to the sprockets and movable from retracted positions to extended positions wherein they pass over the bed knife end section with a shearing action; and
(j) detent means to selectively retain the edging blades in either of said positions.

3. A lawn mower of the reel type comprising:
(a) a frame;
(b) ground wheels operatively secured to the frame;
(c) a central axle with sprocket means thereon carrying reel type lawn mower blades;
(d) a bed knife secured to the frame and including a central section and at least one end section;
(e) the central section having at least one V-shaped notch formed therein;
(f) said reel blades carrying pick-up projection means adapted to coact with the bed knife notches; and
(g) edging blade means secured to said sprockets and and adpated to provide a shearing action with the bed knife end section.

4. A lawn mower of the reel type, the lawn mower comprising:
(a) a frame;
(b) ground wheels on the frame;
(c) a blade reel mounted in the frame, including a plurality of blades;
(d) a bed knife secured to the frame beneath the blade reel, including an elongated central section and at least one end section;
(e) the central section having a plurality of notches formed therein at spaced locations;
(f) pick-up projection means extending outwardly from the blades and passing through the bed knife notches; and
(g) retractable edging blade means secured to the blade reel adjacent one end thereof and passing adjacent the bed knife end section to provide a shearing action therewith.

5. A lawn mower as defined in claim 4, wherein said pick-up projection means comprise plates of generally triangular shape having plural lands and grooves on one side thereof to provide toothed cutting edges.

6. A lawn mower of the reel type, the lawn mower comprising:
(a) a frame;
(b) ground wheels on the frame;
(c) a blade reel mounted in the frame, including a plurality of blades;
(d) a bed knife secured to the frame beneath the blade reel, including an elongated central section;
(e) the central section having a plurality of notches of a selected configuration formed therein at spaced locations; and
(f) pick-up projection means conforming to said selected configuration extending outwardly from the blades and passing through the bed knife notches.

7. A lawn mower of the reel type which includes a frame, ground wheels on the frame, a blade reel assembly including blades and end sprockets, and a bed knife which has a central section located in a horizontal plane the combination of:
   (a) retractable edging blade means secured to the blade reel sprocket adjacent one end thereof; and
   (b) a bed knife end section secured to the bed knife and occupying a depressed plane with respect to that of the bed knife central section beneath the edging blade.

8. A lawn mower as defined in claim 7, wherein:
   (a) the edging blade means comprises an arm member, a blade secured to the arm member in angular relation thereto, and handle means secured to the arm member; and
   (b) the blade is moved across the bed knife end section to produce a shearing action.

9. A lawn mower as defined in claim 7, wherein:
   (a) the retractable edging blade means is pivotally mounted on the sprocket.

References Cited in the file of this patent
UNITED STATES PATENTS

| | | |
|---|---|---|
| 553,095 | Beekman | Jan. 14, 1896 |
| 730,133 | Lake | June 2, 1903 |
| 801,122 | West | Oct. 3, 1905 |
| 1,293,321 | Brisben | Feb. 4, 1919 |
| 2,011,005 | Mack | Aug. 13, 1935 |
| 2,608,044 | McAuliffe | Aug. 26, 1952 |